United States Patent
Hoffman

(10) Patent No.: US 7,102,137 B2
(45) Date of Patent: Sep. 5, 2006

(54) METHOD AND APPARATUS FOR IMPROVING SLICE TO SLICE RESOLUTION BY STAGGERING CELLS IN THE Z-AXIS

(75) Inventor: David M. Hoffman, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 10/668,587

(22) Filed: Sep. 23, 2003

(65) Prior Publication Data

US 2005/0061984 A1   Mar. 24, 2005

(51) Int. Cl.
*G01T 1/20* (2006.01)
*G01N 23/00* (2006.01)
(52) U.S. Cl. ......................................... 250/369; 378/19
(58) Field of Classification Search ................ 250/369; 378/19
See application file for complete search history.

(56) References Cited

U.S. PATENT DOCUMENTS

| | | | |
|---|---|---|---|
| 5,510,622 A * | 4/1996 | Hu et al. | 250/367 |
| 6,426,991 B1 * | 7/2002 | Mattson et al. | 378/19 |
| 2002/0085108 A1 * | 7/2002 | Hoffman | 348/302 |
| 2002/0122127 A1 | 9/2002 | Hoffman | |

* cited by examiner

*Primary Examiner*—David Porta
*Assistant Examiner*—Mindy Vu
(74) *Attorney, Agent, or Firm*—Henry Policinski; Joseph S. Heino; Patrick M. Bergin

(57) ABSTRACT

The present invention provides a CT detector module with cell summing in the Z-direction and cell staggering in the X-direction. The present invention also provides a method for implementing the present invention by simply combining the cells in the Z-direction. The staggering of the cells in the Z-axis improves the signal sampling in the Z-direction without changing either the X-axis or Y-axis resolution. In effect, this provides spatial resolution in the Z-direction.

9 Claims, 3 Drawing Sheets

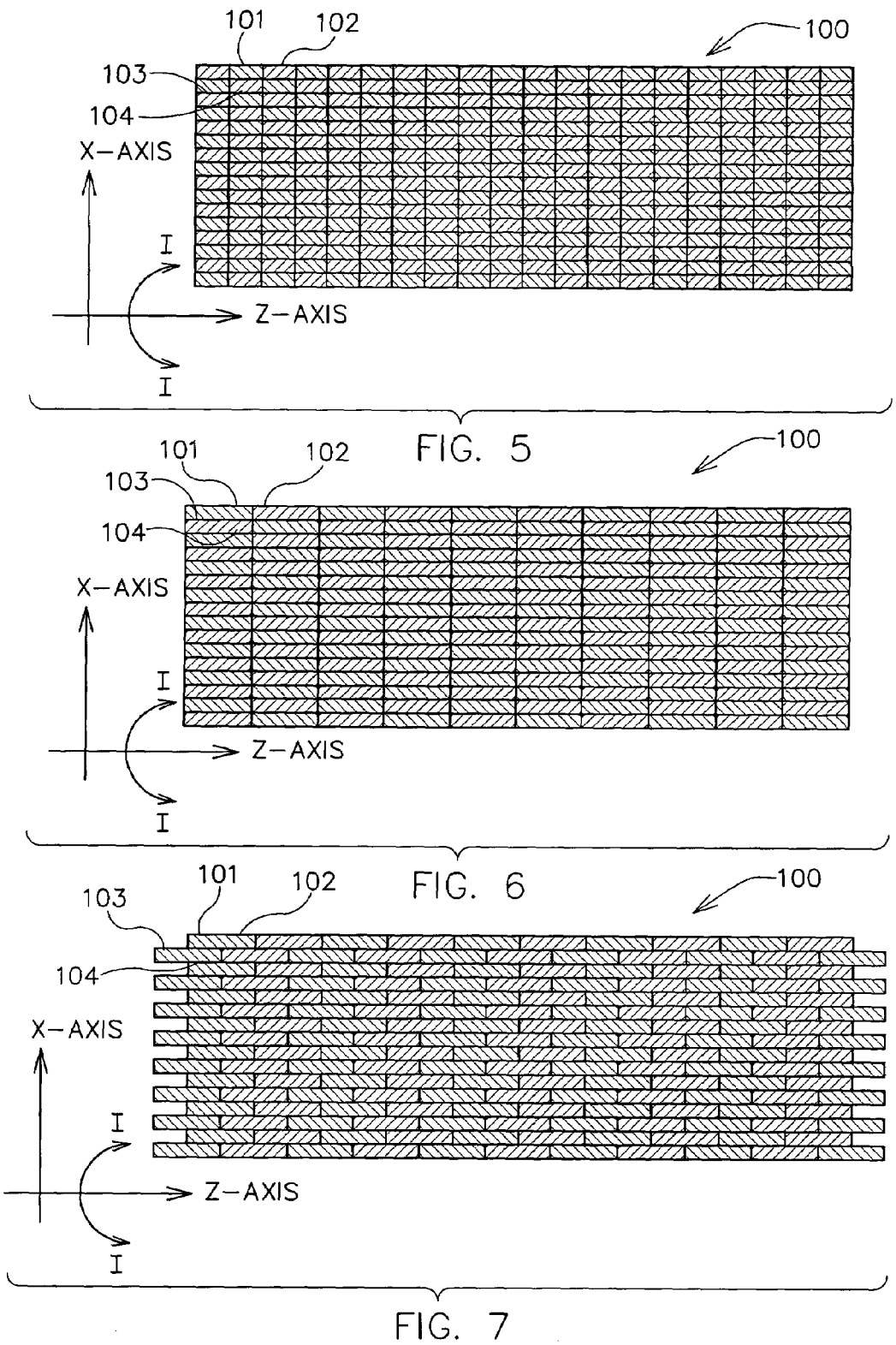

METHOD AND APPARATUS FOR IMPROVING SLICE TO SLICE RESOLUTION BY STAGGERING CELLS IN THE Z-AXIS

BACKGROUND OF THE INVENTION

This invention relates to an improved computed tomography (CT) system. More specifically, this invention relates to an improved CT detector module.

In at least one known CT system, an X-ray source projects a fan-shaped beam which is collimated to lie within an X-y plane of a Cartesian coordinate system and generally referred to as the "imaging plane." The X-ray beam passes through the object being imaged, such as a patient. The beam, after being attenuated by the object, impinges upon an array of radiation detectors. The intensity of the attenuated beam radiation received at the detector array is dependent upon the attenuation of the X-ray beam by the object. Each detector element of the array produces a separate electrical signal that is a measurement of the beam attenuation at the detector location. The attenuation measurements from all the detectors are acquired separately to produce a transmission profile.

In known third generation CT systems, the X-ray source and the detector array are rotated with a gantry within the imaging plane and around the object to be imaged so that the angle at which the X-ray beam intersects the object constantly changes. A group of X-ray attenuation measurements, i.e., projection data, from the detector array at one gantry angle is referred to as a "view." A "scan" of the object comprises a set of views made at different gantry angles, or view angles, during one revolution the X-ray source and detector. In an axial scan, the projection data is processed to construct an image that corresponds to a two dimensional slice taken through the object. One method of reconstructing an image from a set of projection data is referred to in the art as the "filtered back" projection technique or process. This process converts the attenuation measurements from a scan into integers called "CT numbers" or "Hounsfield units" which are used to control the brightness of a corresponding pixel in a cathode ray tube display.

At least one known detector CT imaging system includes a plurality of detector modules each having a plurality of detector cells having a scintillator array optically coupled to a semiconductor photodiode array that detects light output by the scintillator array. These known detector module assemblies require an increasing number of scintillator/diode rows in the Z direction, along with associated electronics to support a desire for increasing the number of CT slices of information gathered per CT rotation.

Therefore, it would be desirable to provide a method for using existing CT detector modules that sum detector cells in the Z-direction. It would be further desirable to provide a method for staggering the summed detector cells. It is also desirable to provide such a method wherein the method of the present invention is implemented using Field Effect Transistor (FET) switch arrays.

BRIEF SUMMARY OF THE INVENTION

There is therefore provided, in one embodiment of the invention, an enhanced method for summing detector cells in the Z-direction. The present invention also provides a method for staggering the combined cells in the Z-axis at the option of the operator or potentially whenever a thicker slice option is selected. The method is implemented by simply combining the cells in the Z-direction. The staggering of the cells in the Z-axis improves the signal sampling in the Z-direction without changing either the X-axis or Y-axis resolution. In effect, this provides spatial resolution in the Z-direction. An added advantage is that the cells are combined using FET switch arrays and can therefore be implemented with very little detector design change.

BRIEF DESCRIPTION OF THE DRAWINGS

FIG. 5 is a schematic view of the center portion of a single module in the event of a high resolution scan.

FIG. 6 is a schematic view of the center portion of a single module showing the imaging pattern normally employed in a lower resolution scan in which detector elements in the Z-axis are combined.

FIG. 7 is a schematic view of the center portion of a single module showing the imaging pattern associated with the present invention.

DETAILED DESCRIPTION

Figure 1:
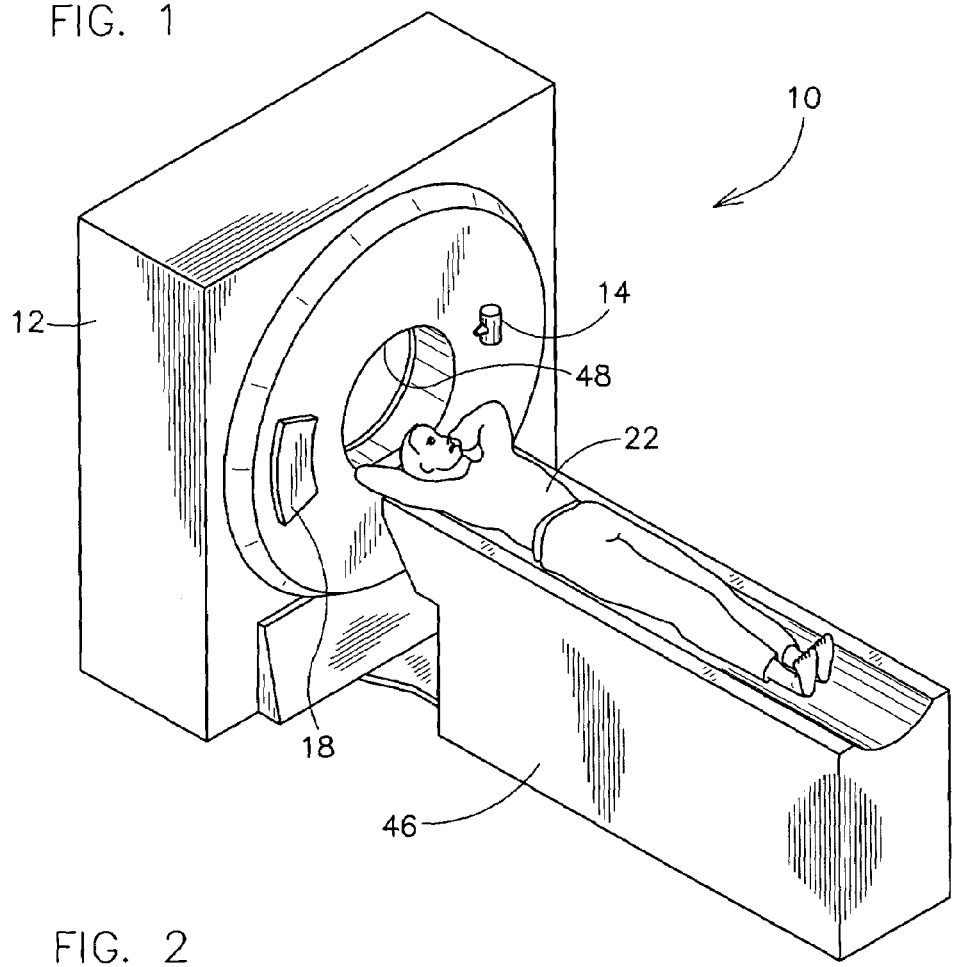
FIG. 1 is a pictorial view of a CT imaging system.
Figure 2:
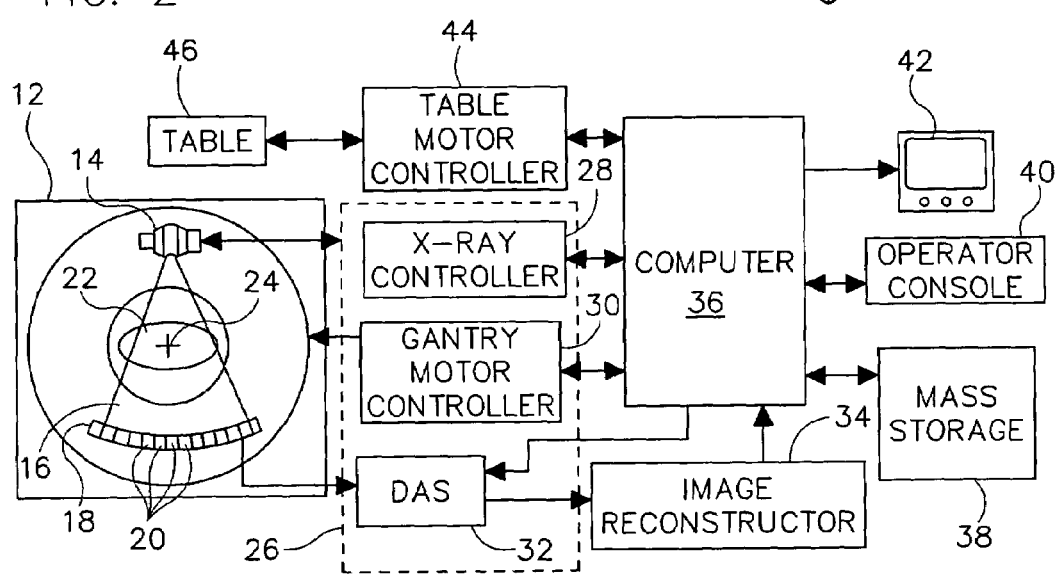
FIG. 2 is a block schematic of the system illustrated in FIG. 1.

Referring now to the drawings in detail wherein like-numbered elements correspond to like elements throughout, FIGS. 1 and 2 show a multi-slice scanning computed tomography (CT) imaging system 10. The CT imaging system 10 is shown as including a gantry 12 representative of a "third generation" CT imaging system. Gantry 12 has an X-ray source 14 that projects a beam of X-rays 16 toward a detector array 18 on the opposite side of gantry 12. Detector array 18 is formed by a plurality of detector rows (not shown) including a plurality of detector elements 20 which together sense the projected X-rays that pass through an object, such as a medical patient 22. Each detector element 20 produces an electrical signal that represents the intensity of an impinging X-ray beam and hence the attenuation of the beam as it passes through object or patient 22. During a scan to acquire X-ray projection data, gantry 12 and the components mounted thereon rotate about a center of rotation 24. FIG. 2 shows only a single row of detector elements 20 (i.e., a detector row). However, multislice detector array 18 includes a plurality of parallel detector rows of detector elements 20 so that projection data corresponding to a plurality of quasi-parallel or parallel slices can be acquired simultaneously during a scan.

Rotation of gantry 12 and the operation of X-ray source 14 are governed by a control mechanism 26 of CT system 10. Control mechanism 26 includes an X-ray controller 28 that provides power and timing signals to X-ray source 14 and a gantry motor controller 30 that controls the rotational speed and position of gantry 12. A data acquisition system (DAS) 32 in control mechanism 26 samples analog data received from detector elements 20 through a flex cable (not shown in FIGS. 1 and 2), and converts the data to digital signals for subsequent processing. An image reconstructor 34 receives sampled and digitized X-ray data from DAS 32 and performs high-speed image reconstruction. The reconstructed image is applied as an input to a computer 36 which stores the image in a mass storage device 38.

Computer 36 also receives commands and scanning parameters from an operator via console 40 that includes at least one input device such as a keyboard or a mouse. An associated cathode ray tube display 42 allows the operator to observe the reconstructed image and other data from computer 36. The operator supplied commands and parameters are used by computer 36 to provide control signals and information to DAS 32, X-ray controller 28 and gantry motor controller 30. In addition, computer 36 operates a table motor controller 44 which controls a motorized table 46 to position patient 22 in gantry 12. Particularly, table 46 moves portions of patient 22 through the gantry opening 48.

In one embodiment, computer 36 includes a device, for example, a floppy disk drive or CD-ROM drive, for reading instructions and/or data from a computer-readable medium, such as a floppy disk or CD-ROM. In another embodiment, computer 36 executes instructions stored in firmware (not shown). Computer 36 is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Figure 3:
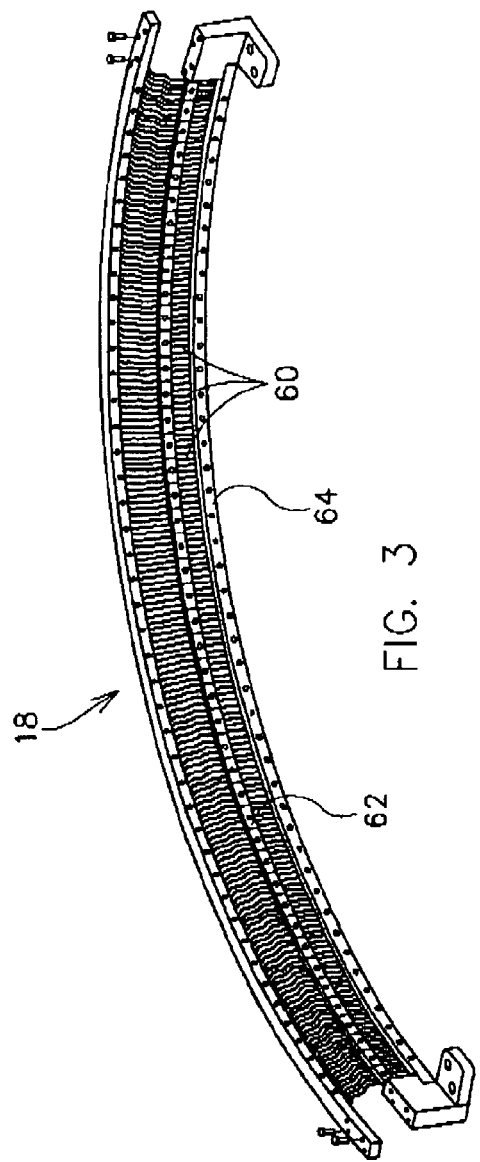
FIG. 3 is a perspective view of a detector array.
Figure 4:
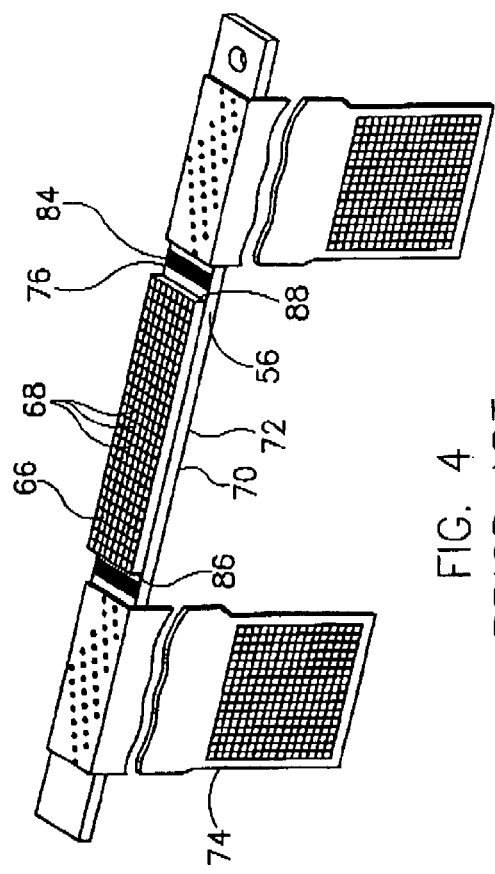
FIG. 4 is a perspective view of a single module.

FIG. 3 is a perspective view of a detector array 18 that includes a plurality of modules 60. FIG. 4 is a perspective view of a single prior art module 60. Each module 60 includes a plurality of detector cells. Each detector module 60 is secured to a detector housing 62 by plates 64. Each module 60 includes a multidimensional scintillator array 66 and a high density semiconductor array (not visible). Scintillator array 66 includes a plurality of scintillation elements arranged in an array, and the semiconductor array includes a plurality of photodiodes arranged in an identical array. The photodiodes are deposited, or bonded on a substrate 56, and scintillator array 66 is positioned over and secured to substrate 56.

Detector modules are comprised of an array of detector elements. Each detector module includes a high density photosensor array and a multidimensional scintillator array positioned above and adjacent to photosensor array. Particularly, scintillator array 66 includes a plurality of scintillator elements 68, while photosensor array 70 includes photodiodes 72, a switch apparatus 84, and a decoder 76. A material such as a titanium dioxide--filled epoxy fills the small spaces between scintillator elements. Photodiodes 72 are individual photodiodes. In another embodiment, photodiodes 72 are deposited or formed on a substrate. Scintillator array 66, as known in the art, is positioned over or adjacent photodiodes 72. Photodiodes 72 are optically coupled to scintiliator array 66 and have electrical output lines for transmitting signals representative of the light output by scintillator array 66. Each photodiode 72 produces a separate low level analog output signal that is a measurement of beam attenuation for a specific scintillator of scintillator array 66. Photodiode output lines (not shown in FIG. 3 or 4) may, for example, be physically located on one side of module 60 or on a plurality of sides of module 60. In the embodiment illustrated in FIG. 4, photodiode outputs are located at opposing sides of the photodiode array.

In one embodiment, as shown in FIG. 3, detector array 18 includes fifty-seven detector modules 100. Each detector module 60 includes a photosensor array 70 and scintillator array 66, each having a detector element 20 array size of 16×16. As a result, array 18 is segmented into 16 rows and 912 columns (16×57 modules) allowing up to N=16 simultaneous slices of data to be collected along a Z-axis with each rotation of gantry 12, where the Z-axis is an axis of rotation of the gantry.

Switch apparatus 84 is a multidimensional semiconductor switch array. Switch apparatus 84 is coupled between photosensor array 70 and DAS 32. Switch apparatus 84, in one embodiment, includes two semiconductor switch arrays 86 and 88. Switch arrays 86 and 88 each include a plurality of field effect transistors (FETS) (not shown) arranged as a multidimensional array. Each FET includes an input electrically connected to one of the respective photodiode output lines, an output, and a control (not shown) arranged as a multidimensional array.

Each FET includes an input electrically connected to one of the respective photodiode output lines, an output, and a control (not shown). FET outputs and controls are connected to lines that are electrically connected to DAS 32 via a flexible electrical cable 74. Particularly about one-half of the photodiode output lines are electrically connected to each FET input line of switch 86 with the other one-half of photodiode output lines electrically connected to FET input lines of switch 88. Flexible electrical cable 74 is thus electrically coupled to photosensor array 70 and is attached, for example, by wire bonding.

Decoder 76 controls the operation of switch apparatus 84 to enable, disable, and/or combine photodiode 72 outputs depending upon a desired number of slices and slice resolution for each slide. Decoder 76 in one embodiment is a FET controller as known in the art. Decoder 76 includes a plurality of output and control lines coupled to switch apparatus 84 and DAS 32. Particularly, the decoder outputs are electrically coupled to the switch apparatus control lines to enable switch apparatus 84 to transmit the proper data from the switch apparatus inputs to the switch apparatus outputs.

Utilizing decoder 76, specific FET's within switch apparatus 84 are selectively enabled, disabled, or combined so that specific photodiode 72 outputs are electrically connected to CT system DAS 32. Decoder 76 enables switch apparatus 84 so that a selected number of rows of photosensor array 70 are connected to DAS 32, resulting in a selected number of slices of data being electrically connected to DAS 32 for processing.

FIGS. 5, 6 and 7 show comparative views of the center section 100 in a sixteen slice CT detector system. At least one known sixteen slice CT detector system features two sizes of CT detector elements 20. The detector elements are 1.0 mm in the Z-direction. On each side of these detector elements are four detector elements (not shown), each of which are 2.0 mm wide in the Z-direction. During a high resolution scan as shown in FIG. 5, the sixteen interior detector elements are used. During a low resolution scan, these inside detector elements are ganged in the Z-direction to form eight uniform detector elements of 2.0 mm wide as shown in FIG. 6 These detector elements are then used with the four outside detector elements on each side to form a wider, but lower resolution scan. FIG. 6 is a schematic view of the detector array 18 set to scan on this lower resolution.

FIG. 7 shows a schematic representation of the staggered method used in the present invention in detail. Specifically, FIG. 7 shows a portion of a detector module 100 wherein a set of detector elements 20 is coupled along the Z-axis. However the detector elements 20 are alternately coupled in the Z-axis so as to provide a staggered effect. These detector elements 20 are combined using the FET switch apparatus 84.

The staggered combination of these detector elements 20 along the Z-axis improves image sampling along the Z-axis with very little impact on sampling in the X-axis. Further, this new combination can be implemented with very few changes in the design of the detector element 20. The CT system 10 has a fixed set of electronics that is already set up to handle all of the cells in the Z-axis, or in the slice plane direction with sixteen slices. The standard method of reducing imaging time is then to increase the width of the slice by combining detector elements 20 in the Z-axis for each data acquisition channel. Combining detector elements 20, or cell summing, reduces image quality, but also reduces imaging times. The present cell summing method uses cell summing along the Z-axis but staggers the cells that are summed. The summing is accomplished by implementing the FET switch arrays slightly differently.

Also shown in FIG. 7 is a plurality of individual detector elements 101, 102, 103 and 104. An extremely high resolution scan would take advantage of each detector element to make the most accurate scan. However, this is not always required for every scan. Therefore, neighboring detector elements in the Z-axis are frequently combined, for example, 101 would be combined with the one un-numbered one before 101, and 103 with 104. However, while the scan proceeds twice as quickly, the resolution associated with this combination of elements is only one-half of that of using each detector element 20.

The present method provides for the combination of 101 with 102, and 103 with 104. When the detector cells are combined in this manner, resolution in the Z-axis improves with very little effect on the rate of sampling in the X-direction. Therefore, in summary, the present invention provides for staggered array of detector elements 20. More specifically, the present invention provides for pairs of two detector elements 20 in a staggered relationship along either the X-axis or the Z-axis.

From the description of the present invention, it is evident that the objects of the invention are obtained. Although the invention has been described and illustrated in detail, it is to be clearly understood that the same is intended by way of illustration and example only and is not to be taken by way of limitation. Accordingly, the spirit and scope of the invention are to be limited only by the terms of the following claims.

What is claimed is:

1. A multislice detector array for a CT system comprising:
    a plurality of detector modules; the detector modules being comprised of:
    a plurality of detector elements, the detector elements being arrayed along both an X-axis and a Z-axis, the adjacent detector elements in the Z-direction being electronically coupled together, the coupled detector elements being arranged in a staggered pattern throughout the detector module.

2. A method for sampling for use with a CT system comprising:
    providing a plurality of detector arrays in a detector module in a CT system;
    providing a plurality of detector elements in a detector array;
    connecting an FET array to the detector elements electronically;
    determining the number of slices required and the thickness of each slice;
    staggering the coupled detector elements in the Z-axis throughout the detector module;
    combining the signals received from adjacent detector elements.

3. A detector module for use in a computed tomography machine, said detector module apparatus comprising:
    a plurality of detector elements;
    a switching array electrically connected to the detector elements;
    a decoder electronically connected to the switching array;
    said decoder operating to electronically couple adjacent detector elements in the Z-axis and staggering the coupled detector elements throughout the detector array such that the signals from the adjacent detector elements are combined.

4. The detector module of claim 3 wherein the switching array comprises a plurality of field effect transistors, wherein each field effect transistor has an input, an output, and a control line.

5. The detector module of claim 4 wherein the decoder controls the switching array to combine outputs of the detector elements.

6. The detector module of claim 5 wherein the detector elements comprise:
    a collimator array;
    a scintillator array;
    a photodiode array optically coupled to said scintillator array;
    a switching array electrically connected to the scintillator array;
    a decoder electronically connected to the switch array, said decoder being configured to control operation of said switch apparatus to combine data signals in accordance to select a staggered pattern of data transmitted during detection of the data from the detector module.

7. A detector module for a computed tomography system, said detector module comprising:
    a collimator array;
    a scintillator array;
    a photodiode array optically coupled to said scintillator array;
    a switching array electrically connected to the scintillator array;
    a decoder electronically connected to the switch array, said decoder being configured to control operation of said switch apparatus to combine data signals from adjacent detector elements coupled together and staggered in the Z-axis throughout a detector array.

8. The detector module of claim 7 wherein the switching array comprises a plurality of field effect transistors, wherein each field effect transistor has an input, an output, and a control line.

9. A method for summing outputs from a detector array in a multislice CT system, having an array of scintillators optically coupled to an array of diodes, said method comprising the steps of electronically coupling adjacent detector elements along the Z-axis, arranging the electronically coupled detector elements throughout the detector array in a staggered pattern and combining the signals received from the coupled detector elements.

* * * * *